May 15, 1956 W. B. ANSPACHER 2,745,909

SCREEN-GRID NEUTRALIZED AMPLIFIER

Filed March 8, 1951

INVENTOR.
W. B. ANSPACHER

BY G. L. O'Brien

R. M. Hicks

ATTYS

United States Patent Office 2,745,909

Patented May 15, 1956

2,745,909

SCREEN-GRID NEUTRALIZED AMPLIFIER

William B. Anspacher, Silver Spring, Md.

Application March 8, 1951, Serial No. 214,620

4 Claims. (Cl. 179—171)

(Granted under Title 35, U. S. Code (1952), sec. 266)

This invention relates generally to amplifier circuits and more particularly to resistance neutralized amplifier circuits in which controlled regenerative feedback is employed between the screen circuits of amplifier stages connected in cascade.

In prior art cascaded amplifiers employing multi-grid thermionic tubes, it is well known to supply the proper operating voltages to the various grid elements by employing biasing resistors and by-passing the resistance thereby introduced by means of a by-pass capacitor which has a low effective impedance at the signal frequency. In particular, such biases are obtained by inserting a resistor in the cathode circuit of a tube and by supplying the operative screen potential of a tube from a source of positive potential through a series dropping resistor. In either case, the tube electrode is by-passed effectively to ground potential by a large by-pass capacitor. Certain prior art devices such, for example, as that disclosed and claimed in the United States Patent to Robert B. Dome, No.2,368,454, provide compensation for the degeneration introduced by the cathode resistors in an amplifier which employs two stages in cascade by interconnecting the cathodes of adjacent stages with an impedance element thereby providing a regenerative voltage from the second stage to the cathode of the stage immediately preceding it sufficient to permit the by-pass capacitors across the cathode resistors in both stages to be eliminated.

The present invention provides a circuit wherein the by-pass capacitors for the cathode and screen electrodes of discharge tubes may be eliminated wholly or in part and the degeneration resulting therefrom eliminated by a regenerative voltage applied to the screen-grid of a low level tube in the amplifier from the screen-grid of a succeeding tube in the amplifier, this voltage being applied in a controlled amount sufficient to overcome the degenerative effects of the removal of by-pass capacitors or even in excess of this amount where desired.

It is an object of this invention to provide a new and improved amplifier circuit.

Another object if this invention is to provide controlled regeneration between the screen-grid circuits of the stages of an amplifier.

A further object of this invention is to compensate for the degenerative effects of unby-passed cathode and screen resistors by the employment of screen circuit regenerative feedback between stages of an amplifier.

Another object of this invention is to provide means for applying a controlled portion of the A. C. component of the screen voltage of one amplifier tube to the screen-grid of the tube next preceding it in a cascaded amplifier arrangement.

A further object of this invention is to provide a regenerative voltage between the screen circuits in an amplifier made up of two or more stages.

Other objects and many of the attendant advantages of this invention will be readily appreciated as the same becomes better understood by reference to the following detailed description when considered in connection with the accompanying drawings wherein.

Figure 1:
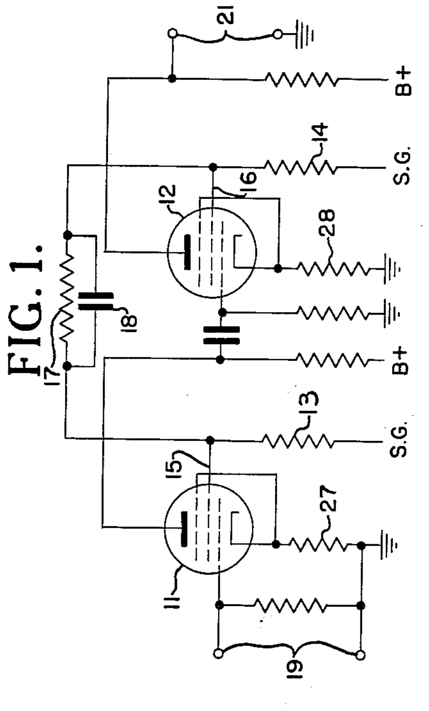
Fig. 1 is a schematic diagram showing the amplifier circuit of the present invention employed in a two-stage amplifier.

Referring now to the drawings wherein like characters of reference are used to designate like parts throughout the various views, and more particularly to Fig. 1 thereof, there is shown thereon a two-stage amplifier employing tubes 11 and 12 having grid and plate circuits connected and supplied in the conventional manner as is the cathode circuit with the exception that the usual by-pass capacitor between the cathode and ground is not present. The D. C. screen supply voltage is provided to the tubes through series dropping resistors 13 and 14 respectively. The D. C. supply SG may conveniently be a tap on or the same supply utilized for the B+ supply. The screens 15 and 16 are interconnected by an impedance element 17 which may be a resistor and may be partially or wholly by-passed by a capacitor 18, if desired. The amplifier as shown will amplify a signal supplied to its input terminals 19 and provide an output signal at its output terminals 21.

The operation of this circuit will now be described. In the absence of the connection effected by impedance elements 17 and 18 between the screens 15 and 16 the signal present at terminals 19 will be amplified and appear as an output at terminals 21 with a certain reduction in the gain available therebetween due to degeneration in the cathode and screen-grid circuits of each tube.

The A. C. variation of the voltage on screen 16 is 180° out of phase with the corresponding voltage on screen 15 with the result that the variations in voltage on screen-grid 15 may be nullified by applying a portion of the larger voltage from screen-grid 16 to screen-grid 15. This voltage can be controlled as to magnitude by means of the impedance 17 because the voltage on screen-grid 16 is larger by the order of magnitude of one stage gain than the corresopnding voltage on screen-grid 15. In a particular case, the voltage supplied via impedance 17 may thereby be of sufficient magnitude to provide a regenerative voltage at screen-grid 15 which is less than, equal to, or greater than the voltage required for neutralization, as may be desired. By applying a regenerative voltage at screen-grid 15 which is in excess of that required to null the variations of voltage there existing, a regenerative A. C. voltage will then exist on the screen-grid 15 resulting in an increase in gain over that which would be obtainable with properly by-passed screen-grid operation. This increase in gain can be utilized to compensate for the degeneration due to unby-passed cathode circuits in both tubes and the unby-passed screen-grid 16 in tube 12.

Figure 2:
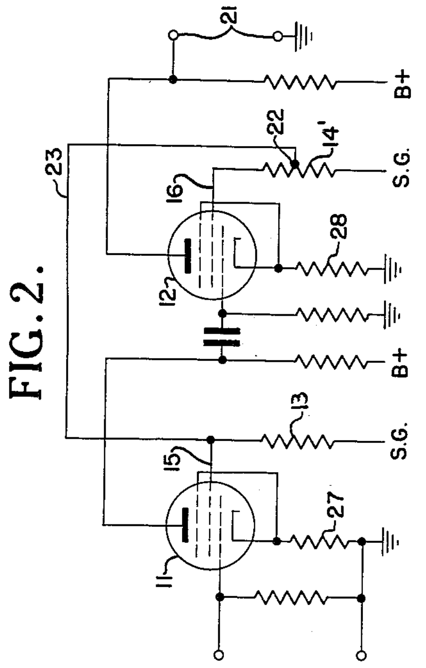
Fig. 2 is a modification of the amplifier circuit of Fig. 1.

Referring now to Fig. 2 there is shown a modification of the present invention wherein the A. C. voltage on screen-grid 16 appears across the tapped resistor 14′ and the proper proportion of this voltage is selected by means of tap 22 and is applied directly therefrom to screen-grid 15 by means of conductor path 23.

Figure 3:
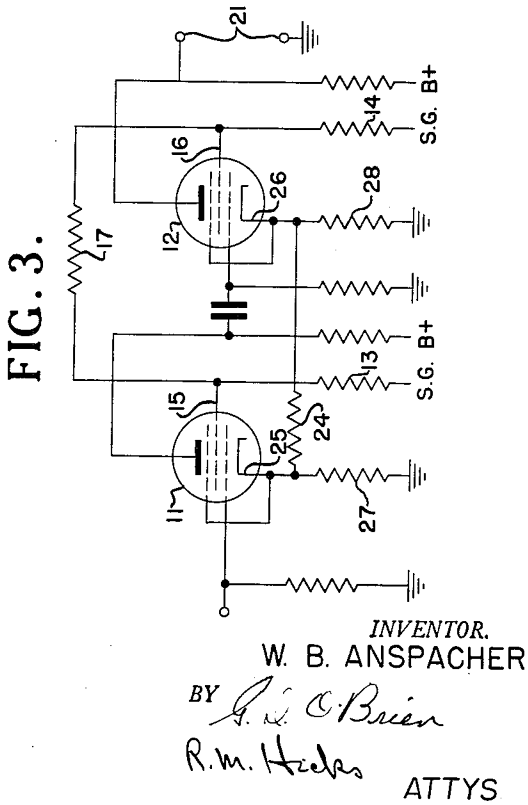
Fig. 3 is a view showing the circuit of Fig. 1 modified to provide regeneration in the cathode circuit.

Fig. 3 shows a modification of the invention in which the regeneration in the screen-grid circuit is combined with teaching of the aforementioned patent of Robert B. Dome to provide a regenerative connection between the cathode circuits of adjacent stages effected by resistor 24 interconnecting cathodes 25 and 26 of tubes 11 and 12 respectively. Cathode resistors 27 and 28 together with interconnecting resistor 24 provide the regenerative voltage feedback in a cathode circuit while resistors 13, 14 and interconnecting resistor 17 provide a regenerative voltage connection in the screen circuits. This circuit may be useful in applications where both regenerative effects are desired.

Figure 4:
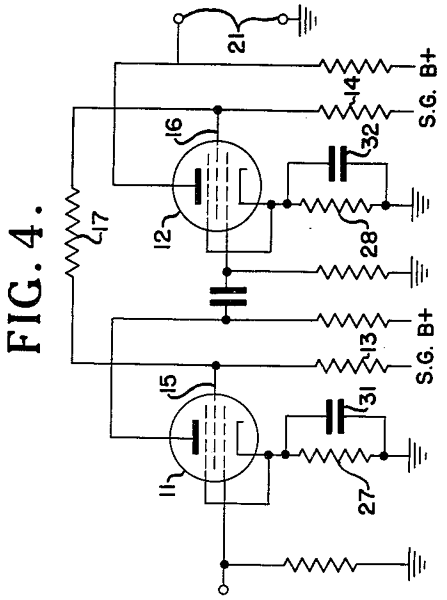
Fig. 4 is a view of the amplifier circuit of the present invention employed with conventional cathode circuit by-passing.

Referring now to Fig. 4 there is shown the circuit essentially as shown in Fig. 1 except that cathode impedances 27 and 28 are by-passed by capacitors 31 and 32, respectively, to thereby substantially eliminate degeneration in the cathode circuits. Such a circuit is useful where the regenerative screen-grid circuit of the present invention is used to overcome only the degeneration in the screen circuits.

While a simple resistance or resistance capacitor connection has been disclosed to provide the feedback between the screen-grids of the present invention, it will be obvious to those skilled in the art that such a simple connection could be replaced by a desired form of network in order to provide a required regenerative voltage on a low level screen-grid which is derived from a higher level point in the circuit and of the proper phase and magnitude.

From the foregoing, it should now be apparent that amplifier circuit arrangements have been provided which are well adapted to fulfill the aforestated objects of the invention. Moreover, it will be readily appreciated by those skilled in the art to which this invention pertains that the circuits of the present invention may be used to advantage in circuits involving printed circuit techniques or circuit applications where space considerations are critical.

Obviously many modifications and variations of the present invention are possible in the light of the above teachings. It is therefore to be understood that within the scope of the appended claims the invention may be practised otherwise than as specifically described.

The invention described herein may be manufactured and used by or for the Government of the United States of America for governmental purposes without the payment of any royalties thereon or therefor.

What is claimed as new and desired to be secured by Letters Patent of the United States is:

1. In an amplifier, the combination comprising first and second electron discharge devices each having a cathode, an anode, a control grid, and a screen grid; first circuit means including a source of potential for applying anode-cathode operating potential to said devices; means for impressing a signal on the control grid of said first device; means coupling said devices in cascade; a source of screen-grid biasing potential; first and second unby-passed dropping resistances respectively connecting the screen grids of said first and second devices to said source of biasing potential; and second circuit means including circuit connections and substantially purely resistive means for connecting solely said resistive means between said screen grids and in tandem therewith to provide a feedback path for applying from the screen grid of said second device a regenerative voltage to the screen grid of said first device to substantially neutralize the degenerative voltages produced by said dropping resistances.

2. In the combination defined in claim 1, a capacitor shunting said resistive means for increasing the response of said amplifier at high frequencies.

3. In an amplifier, the combination comprising first and second electron discharge devices each having a cathode, an anode, a control electrode and a screen electrode; circuit means including a source of potential for applying anode-cathode operating potential to said devices; means for impressing a signal on the control electrode of said first device; means coupling said devices in cascade; a source of screen electrode biasing potential; first and second unby-passed dropping resistances respectively connecting the screen electrodes of said first and second devices to said biasing potential; a third resistance solely and directly interconnecting said screen electrodes; fourth and fifth unby-passed resistances respectively connecting the cathodes of said first and second devices to ground; and a sixth resistance solely and directly interconnecting said cathodes at the junction thereof with their respective unby-passed resistances; said third resistance solely providing a feedback path for applying from the screen electrode of said second device a regenerative voltage to the screen electrode of said first device and said sixth resistance solely providing a feedback path for applying from the cathode of said second device a regenerative voltage to the cathode of said first device whereby the degenerative voltages produced by said unby-passed cathode and screen resistances are substantially overcome.

4. The amplifier according to claim 1 in which said circuit connections consist of an adjustable intermediate tap on said second dropping resistance and lead means directly connecting the grid of said first device to said tap and in which said resistive means consists of that portion of said second dropping resistance between the screen grid of said second device and said tap.

References Cited in the file of this patent

UNITED STATES PATENTS

| | | |
|---|---|---|
| 2,024,489 | Van der Pol et al. | Dec. 17, 1935 |
| 2,065,257 | Woll | Dec. 22, 1936 |
| 2,085,196 | Koch | June 29, 1937 |
| 2,204,422 | Loughren et al. | June 11, 1940 |
| 2,226,945 | Rocard | Dec. 31, 1940 |
| 2,272,235 | Boucke | Feb. 10, 1942 |
| 2,345,761 | Lybarger | Apr. 4, 1944 |
| 2,416,513 | Brown | Feb. 25, 1947 |
| 2,497,859 | Boughtwood | Feb. 21, 1950 |

FOREIGN PATENTS

| | | |
|---|---|---|
| 529,441 | Great Britain | Nov. 21, 1940 |